July 10, 1923.

R. S. MOORE ET AL

OIL FILTER

Filed July 14, 1920

1,461,627

WITNESSES
Gerald Hennessy,
B. J. Garvey

Richard S. Moore
Leon B. Jones
INVENTORS

BY
Richard B. Owen
ATTORNEY.

Patented July 10, 1923.

1,461,627

UNITED STATES PATENT OFFICE.

RICHARD S. MOORE AND LEON B. JONES, OF ROCKDALE, TEXAS.

OIL FILTER.

Application filed July 14, 1920. Serial No. 396,077.

*To all whom it may concern:*

Be it known that we, RICHARD S. MOORE and LEON B. JONES, citizens of the United States, residing at Rockdale, in the county of Milam and State of Texas, have invented certain new and useful Improvements in Oil Filters, of which the following is a specification.

This invention relates to oil filters for extracting sediment and water from the oil.

The principal object of the invention is to provide a filter especially adapted for use with oil stoves to separate extraneous materials from the oil and to increase its volatility and also prevent clogging of the burner valve.

A further object of the invention is to provide a filter which may be conveniently associated with the source of supply and will not unduly encumber the stove or other apparatus with which it is connected.

Figure 1:
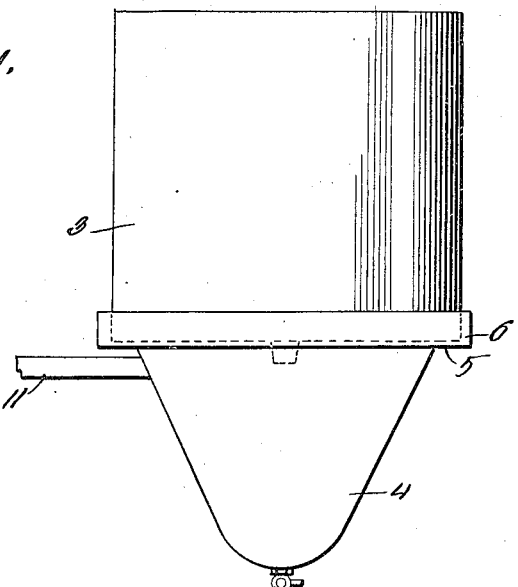
Figure 2:
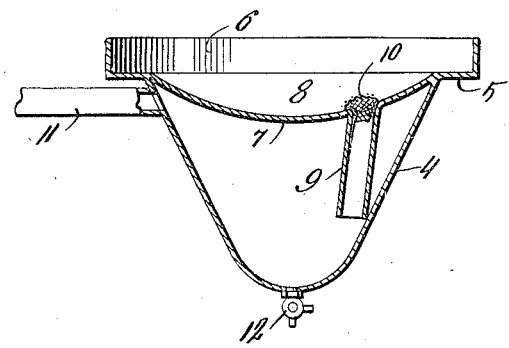

The above and other objects of our invention will be in part described and in part understood from the following description of the present preferred embodiment of the invention taken in connection with the accompanying drawings, wherein:

Fig. 1, is an elevational view of a filter constructed in accordance with our invention, and Fig. 2, is a vertical sectional view of the filter, a portion of the feed pipe being shown in elevation.

In the drawings in order to illustrate the application of our invention an oil reservoir 3 is shown, in the present instance being shown to be of a cylindrical configuration.

The filter comprises a truncated cone-shaped body 4, the upper end of which is bent out at an angle to provide a horizontal supporting flange 5, the latter having an annulus 6 upstanding therefrom. A semicircular partition 7 is formed in the upper end of the body 4 to provide a hemispherically-shaped auxiliary chamber 8. This chamber has a spout 9 depending from its bottom, the spout having its inception adjacent the inner wall of said body 4 and its outlet end in contact with said wall at a point above the bottom of said body. This arrangement of the spout 9 causes water and sediment to be immediately carried to the bottom of the body 4 from which point they may be quickly removed through the valve 12. A straining means 10 of any desired type is arranged in the upper end of the spout as shown to advantage in Fig. 2.

A feed pipe 11 communicates with the main body of said filter directly below the auxiliary chamber 8 and is adapted to extend to the stove or other desired point where the oil is to be used.

In order to permit the water and sediment, which gravitate to the bottom of said body 4, to be removed a valve 12 is arranged in the bottom of said body.

In use of the device the oil reservoir is mounted upon the supporting flange 5, displacement of the reservoir being prevented by the annulus 6. The oil is permitted to gravitate from said reservoir into the auxiliary chamber 8 thence through the strainer 10 into the spout 9 and ultimately against the lower inner wall of the main body 4. The oil is then withdrawn when desired through the feed pipe 11.

Various changes may be made in the details of construction, proportion and arrangement of parts as will be permitted by the claims appended hereto.

What we claim is:

1. An oil filter for stoves including a tapering receptacle the upper marginal edge of which is bent outwardly at right angles to provide a supporting ledge for supporting an oil can, a partition formed in said receptacle having its periphery integral with the upper end of the receptacle and being dished downwardly into the body of the latter to provide a basin for primarily receiving oil dispensed from the oil can, a filter carrying support depending from said partition and discharging against the tapering wall of said receptacle, and a feed pipe leading from said receptacle directly beneath said partition to carry off the oil from said receptacle.

2. An oil filter including a cone-shaped body having a partition at its upper end which pends downwardly in the body, a spout issuing from said partition at a point adjacent from the periphery of said body and extending downwardly in the latter to discharge liquids, passing therethrough, against the wall of said body at a point adjacent the bottom of the latter.

RICHARD S. MOORE.
LEON B. JONES.

Witnesses:
HOMER H. TURNER,
MARSHALL J. FLOYD.